W. C. KORTHALS-ALTES.
CONVERTER.
APPLICATION FILED DEC. 22, 1917.
1,380,978.
Patented June 7, 1921.
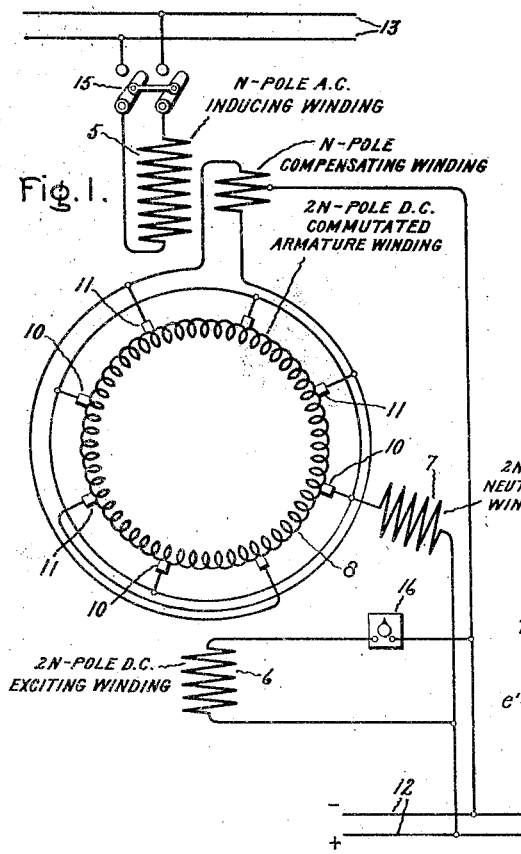
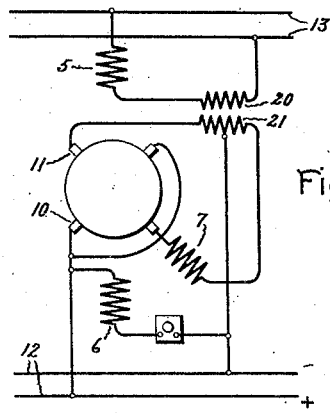
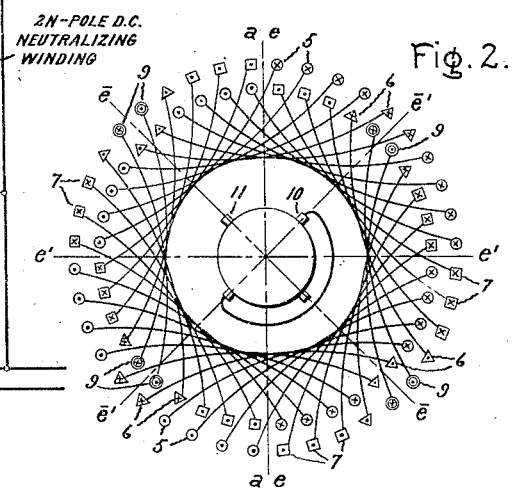
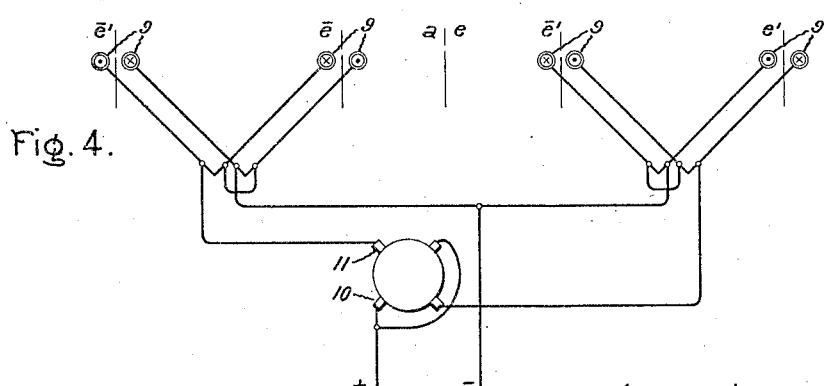
Inventor:
Willem C. Korthals-Altes,
by
His Attorney.

UNITED STATES PATENT OFFICE.

WILLEM C. KORTHALS-ALTES, OF SCHENECTADY, NEW YORK, ASSIGNOR TO GENERAL ELECTRIC COMPANY, A CORPORATION OF NEW YORK.

CONVERTER.

1,380,978. Specification of Letters Patent. Patented June 7, 1921.

Application filed December 22, 1917. Serial No. 208,508.

*To all whom it may concern:*

Be it known that I, WILLEM C. KORTHALS-ALTES, a subject of the Queen of the Netherlands, residing at Schenectady, in the county of Schenectady, State of New York, have invented certain new and useful Improvements in Converters, of which the following is a specification.

My invention relates to converters for converting alternating current electric energy into direct current electric energy, and vice versa. More particularly, my present invention relates to converters of the non-synchronous type in which regulation of the direct current voltage can be conveniently obtained by regulating the direct current exciting flux. The object of the invention is to provide an improved converter of the non-synchronous type in which the direct current voltage can be conveniently regulated. More particularly the object of the invention is to provide a converter in which the voltage characteristic of the direct current generator component droops with increased load. Other objects of the invention will be brought out in the course of the following description.

The direct current voltage of the well known synchronous converter cannot be regulated to any appreciable extent by regulating its direct current excitation. When it is necessary or desirable to obtain considerable direct current voltage regulation with a synchronous converter it is the usual practice to associate with the converter auxiliary boosting apparatus or means for this particular purpose. For small equipments, it is, however, generally preferable to employ a motor-generator set in case a considerable regulation of the direct current voltage is desired. The motor generator set consists of two complete and independent dynamo-electric machines, and in order to reduce the cost of such an outfit it is very desirable to combine the motor and generator components thereof in a single dynamo-electric machine. This result is accomplished in the induction converter which consists essentially of an alternating current component of the induction type and a direct current component mechanically combined in a single dynamo-electric machine and using the same magnetic material in such a manner that the magnetic reactions of one component do not interfere with those of the other. The direct current voltage of the induction converter can be very conveniently regulated by regulation of the exciting flux of the direct current component thereof. When employed to convert alternating current energy into direct current energy, the induction component of the induction converter operates as an induction motor, and due to the substantially constant speed characteristic of an induction motor the direct current component of the converter has a generator voltage characteristic which drops only slightly with increased load. For some purposes it is desirable to obtain a voltage characteristic of the direct current generator which droops with increasing load. For example, such a voltage characteristic is desired for operating the direct current arc lamps of moving picture machines. In accordance with my present invention, such a drooping voltage characteristic of the direct current generator is obtained by making the alternating current component of the converter of the repulsion motor type. I prefer to compensate the repulsion motor component of such a machine by providing a polyphase arrangement of the commutator brushes, in which event the same brushes that effect the repulsion motor connections of the armature winding may be suitably connected to serve as the positive and negative brushes of the direct current generator. The theory of operation of repulsion motors compensated by means of brushes placed on the rotor in addition to the energy brushes has been thoroughly investigated by the applicant and has been explained in a series of articles appearing in the *General Electric Review* beginning with the December, 1916, number. In addition to the repulsion motor inducing winding, and compensating winding when shunt compensation is employed, the stator of my improved repulsion converter carries a direct current exciting winding and a direct current neutralizing winding.

The novel features of the invention which I believe to be patentable are definitely indicated in the appended claims. The construction and mode of operation of a repulsion converter embodying the invention will be understood from the following description taken in conjunction with the accompanying drawings, in which;

Figure 1 is a diagrammatic view of a repulsion converter embodying the features of the invention; Fig. 2 is a diagrammatic view showing a suitable arrangement of the stator windings for the repulsion converter of Fig. 1; Fig. 3 diagrammatically illustrates a slightly modified arrangement in which the repulsion motor component is given series compensation; and Fig. 4 is an explanatory diagram for a portion of the stator windings.

The stator member of my improved converter carries three principal windings, an alternating current inducing winding 5, a direct current exciting winding 6 and a direct current neutralizing winding 7. I prefer to design the inducing winding 5 as an $n$-pole winding and the exciting and neutralizing windings 6 and 7 as $2n$-pole windings. With this ratio of pole numbers of the alternating and direct current components of the converter, the magnetic reactions of the two components will not interfere, but it will be understood by those skilled in the art that other ratios of pole numbers may be employed, and I do not therefore wish to be restricted to the particular ratio I have herein mentioned for the purpose of explaining the principle of my invention. The three stator windings 5, 6 and 7 may be of any suitable types. Preferably, each of these windings is of the distributed type, and may very advantageously be wound of uniform coils assembled in distributed stator coils as described in my corresponding application Ser. No. 208,505 filed Dec. 22, 1917, and as illustrated in Fig. 2 of the accompanying drawings. For the sake of simplicity, the inducing winding is shown in Fig. 2 as wound for two poles and the exciting and neutralizing windings for four poles. In practice, however, I prefer to have $n$ greater than two, and in the arrangement diagrammatically represented in Fig. 1 the repulsion motor component of the converter has four poles and the direct current component eight poles. The rotor member of my improved converter carries a single commutated armature winding 8 of the direct current type wound for $2n$ poles. In accordance with my present invention a polyphase arrangement of commutator brushes 10 and 11 is associated with the commutator of the armature winding. These commutator brushes serve both as the repulsion motor brushes and as the positive and negative brushes of the direct current component of the converter.

The arrangement of the three stator windings 5, 6 and 7 will be best understood by reference to Fig. 2. Each of these windings is composed of uniform coils of 50 per cent. pitch with respect to $n$ poles and 100 per cent. pitch with respect to $2n$ poles. The inducing winding 5 is wound with its magnetizing axis along the line $a$—$a$, and is a completely distributed single-layer lap-winding composed of coils of 50 per cent. pitch assembled in the distributed stator slots as an equivalent full pitch winding of $n$ poles. The shunt compensation for the repulsion motor component may be obtained from suitable taps on the inducing winding 5 in the well understood manner, but I prefer to obtain this shunt compensation from separate coils 9 whose resultant magnetizing axis is coincident with that of the inducing winding 5. In the arrangement represented in Fig. 2, I have shown two coils 9 per pair of poles of the inducing winding, but it will of course be understood that as many coils 9 may be used as is required to produce the desired shunt compensation for the repulsion motor component. Although the compensating winding 9 has conductors in each of the four quadrants of the winding, as shown in Fig. 2, the direction of the currents in these windings is such that there are two axes produced—one along $\bar{e}$—$\bar{e}$ and another along $\bar{e}'$—$\bar{e}'$; the resultant axis is evidently coincident with the axis $a$—$a$. The stator member represented in Fig. 2 has 40 slots, 32 of which are one-half filled with the conductors of the inducing winding 5, and 8 are one-half filled with conductors of the compensating coils or winding 9. The other half of 16 of these slots is occupied by the conductors of the exciting winding 6, and the other half of the remaining 24 slots is occupied by the conductors of the neutralizing winding 7. In Fig. 2, the conductors of the inducing winding 5 and of the compensating winding 9 are represented by circles, the conductors of the exciting winding 6 are represented by triangles, and the conductors of the neutralizing winding 7 are represented by squares. The conductors of the compensating winding 9 are indicated by double circles to distinguish them from the coils of the inducing winding 5. Current distribution in the various conductors of the stator windings is shown by means of the usual convention, in which crosses and dots applied to the conductors indicate, respectively, that the current is flowing away from or toward the observer. It will be observed that the magnetizing axes ($e$—$e$) of alternate $n$ poles of the $2n$ poles of the exciting winding 6 are coincident with the magnetizing axes ($a$—$a$) of the inducing winding 5, while the magnetizing axes ($e'$—$e'$) of the other alternate $n$ poles of the exciting winding 6 are displaced 90 electrical degrees, with respect to $n$ poles, from the magnetizing axes of the inducing winding 5. The magnetizing axes ($\bar{e}$—$\bar{e}$ and $\bar{e}'$—$\bar{e}'$) of alternate poles of the $2n$-pole neutralizing winding are, accordingly, displaced 45 and 135 electrical degrees, respectively, with respect to $n$ poles, from the magnetizing axes ($a$—$a$) of the inducing winding.

The compensated repulsion motor component of my improved converter has two sets of commutator brushes per pair of poles. One set of these brushes 10 is short-circuited and constitutes the energy or working brushes, while the other set 11 is connected to the compensating winding 9 and constitutes the compensating brushes of the repulsion motor component. As is well understood, for repulsion motor operation the energy brushes 10 are displaced from the axis of the inducing winding 5 and the compensating brushes 11 are preferably displaced 90 electrical degrees from the energy brushes. By reference to Fig. 2 of the drawings, it will be seen that if the displacement of the energy brushes 10 from the axis ($a$—$a$) of the inducing winding is 45 electrical degrees, with respect to $n$ poles, the energy brushes 10 will be in exactly the correct positions to serve as one set of brushes of the direct current component of the converter, while the compensating brushes 11 will be in exactly the correct positions to serve as the other set of direct current brushes. Thus in the machines represented in Figs. 1 and 2 of the accompanying drawing I have assumed that the energy brushes 10 constitute the positive (+) brushes of the direct current component of the converter and these brushes are connected together and to the positive side of the direct current circuit 12. The compensating brushes then constitute the negative (—) brushes of the direct current component, and since these brushes are connected across the compensating winding 9, I connect the middle point of this winding to the negative side of the direct current circuit 12. With a repulsion motor brush displacement of 45 degrees, the coils of the compensating winding 9 serve in effect as a 2$n$-pole interpole winding for the direct current component of the converter, as will be clearly seen by reference to Fig. 2 of the drawings. The arrangement and connections for the compensating coils 9 to the brushes 10 and 11 are more clearly shown in Fig. 4; brushes 10 being connected to the positive side of the direct current circuit, the brushes 11 being connected to the negative (—) sides of the direct current circuit.

When the pole ratios of the alternating and direct current components of the converter are 1 to 2, I prefer to employ a repulsion motor brush displacement of 45 degrees because this is the most advantageous brush arrangement for the direct current component, but it will of course be understood that the repulsion motor brush displacement need not be 45 degrees, since my improved repulsion converter will operate satisfactorily with other brush displacements.

The operation of my improved repulsion converter will it is believed be understood from the foregoing description. When the main switch 15 is closed the inducing winding 5 will be connected across the single phase alternating current supply circuit 13. The converter will then start as a repulsion motor in the well understood manner. The direct current component will operate as an ordinary shunt generator to deliver direct current energy to the D. C. circuit 12. The voltage of this direct current generator component can be very conveniently regulated by a rheostat 16 in the circuit of the exciting winding 6. The speed of the repulsion motor decreases as the load increases, and therefore, as the direct current load increases the direct current generator voltage will drop due to the decreased speed of the converter. The direct current component of the converter is thereby given a drooping voltage characteristic with increasing load, which as previously mentioned is desirable in operating the arc lamps of moving picture machines.

In case a greater variation in voltage is desired with increasing load the compensation of the repulsion motor component may be series instead of shunt, as diagrammatically indicated in Fig. 3. A small transformer has its primary winding 20 connected in series with the inducing winding 5. The secondary winding 21 of this transformer is connected across the compensating brushes 11 and furnishes the series compensation for the repulsion motor. Although I have shown in the present instance a series transformer by means of which the compensating brushes 11 are indirectly placed in series with the inducing winding, it is not essential and may be omitted, if desired, and brushes 11 may be directly connected in series. The positive (+) and negative (—) terminals of the direct current circuit are then connected to the energy brushes 10 and to the middle point of the secondary winding 21, respectively. The other features of the converter are the same as described in connection with Figs. 1 and 2, except that the coils 9 are replaced by coils of the inducing winding 5.

In addition to its drooping D. C. voltage characteristic, the repulsion converter has a further advantage when the converter is to be used for converting single phase alternating current energy into direct current energy. In such a case, the converter is started with no auxiliary starting apparatus or connections. All that need be done is to connect the inducing winding to the single phase A. C. circuit and the converter will start and run up to speed and no change in connections has to be made for the normal running operation. This simplification of starting is again of importance in operating the direct current arc lamps of moving picture machines, since the source of energy is generally single phase alternating current.

Instead of the compensating winding 9 wound on the stator so as to coincide with the magnetic axis $a$—$a$ of the inducing winding 5, I may use a compensating winding whose axis is displaced 90 electrical degrees from this axis, having a series arrangement with respect to the winding 5 such as shown in Fig. 3.

Having now described what are at present the best embodiments of my invention known to me for purposes of illustration, in compliance with the requirements of the patent statutes, I would have it understood that I do not mean to be limited thereby to the precise details here shown since obvious changes will occur to those skilled in the art, nor in the choice of recognized equivalents except as defined in my claims hereunto annexed.

What I claim as new and desire to secure by Letters Patent of the United States, is:

1. A dynamo electric machine adapted to be operated from an alternating current source and to furnish direct current, comprising a stator member and a rotor member, said stator member having an $n$-pole winding adapted to be connected to an alternating current source, and a $2n$-pole exciting winding adapted to be connected to a direct current source, and said rotor member being provided with a $2n$-pole commuted winding, and positive and negative sets of brushes for the direct current circuit, one of said sets also serving as closed-circuited energy brushes for the alternating current circuit, the axes of the windings on the stator being such that the axes of the closed circuit completed by the energy brushes are displaced from the axes of the $n$-pole field.

2. A combined alternating current and direct current dynamo electric machine comprising in combination, a slotted stator member having an alternating current inducing winding, a direct current exciting winding, a direct current neutralizing winding, and a compensating winding distributed in the slots so as to form when assembled a two-layer lap winding; a rotor member having a commuted winding, and coöperating short circuited brushes therefor having connections for completing the operating arrangements of both the alternating and direct current components of said machine.

3. A combined alternating current and direct current dynamo electric machine comprising in combination, a slotted stator member having an alternating current inducing winding, a direct current exciting winding, a direct current neutralizing winding, and a compensating winding distributed in the slots so as to form, when assembled, a two-layer lap winding; a rotor member having a commuted winding, and coöperating short circuited brushes therefor having connections for completing the operating arrangements of both the alternating and direct current components of said machine; one set of said brushes being short circuited through said compensating winding.

4. A combined alternating current and direct current dynamo electric machine comprising in combination, a stator member having a plurality of distributed slots, an alternating current inducing winding and compensating winding filling one-half of all of said slots, a direct current exciting winding and a neutralizing winding filling the other half of all of said slots; said winding being composed of uniform coils assembled to form a two-layer lap winding, a rotor member having a commuted winding, and coöperating short circuited brushes therefor arranged to serve both the alternating and direct current components; one set of brushes being short circuited through said compensating winding, the middle point of said compensating winding being connected to one side of a direct current circuit, the other set of brushes being connected to the other side thereof.

5. A combined alternating current and direct current dynamo electric machine comprising in combination, a stator member having a plurality of distributed slots, an $n$-pole alternating current inducing winding, and compensating winding, a $2n$-pole direct current exciting winding and $2n$-pole neutralizing winding, said windings all being assembled to form mechanically a single two-layer winding in said slots, a rotor member having a commuted winding and coöperating brushes short circuited to complete the alternating current component of said converter and connections to said brushes including a portion of said windings to complete the direct current component of said machine.

6. A combined alternating current and direct current dynamo electric machine comprising a stator member and a rotor member, said stator member having an $n$-pole winding adapted to be connected to an alternating current source, and a $2n$-pole exciting winding adapted for connection to a direct current source, and said rotor member being provided with a commuted winding responsive to both $n$-poles and $2n$-poles, positive and negative sets of brushes for the direct current circuit, one of said sets also serving as closed circuit energy brushes for the alternating current circuit, the winding on the stator being so arranged that the axes of the closed circuit completed by the energy brushes are displaced from the axes of the poles of the $n$-pole winding, and a compensating winding connected to the other set of brushes.

In witness whereof, I have hereunto set my hand this 21st day of December 1917.

WILLEM C. KORTHALS-ALTES.